United States Patent Office 2,800,912
Patented July 30, 1957

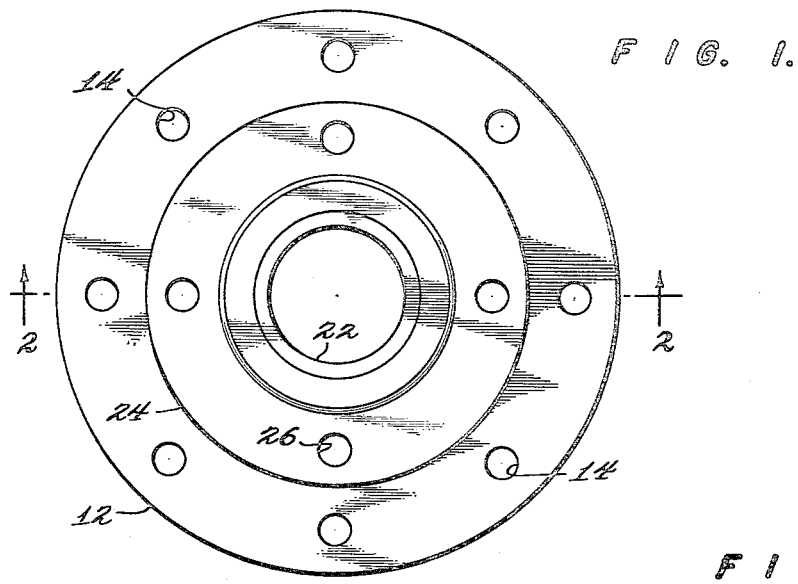
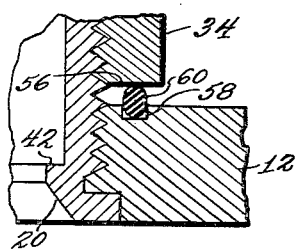
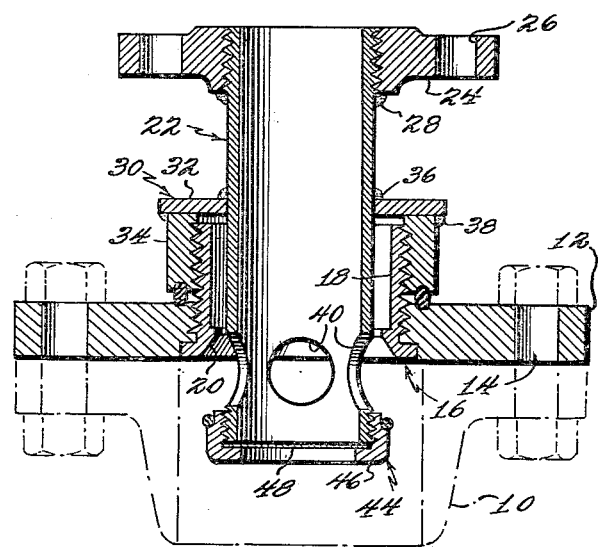
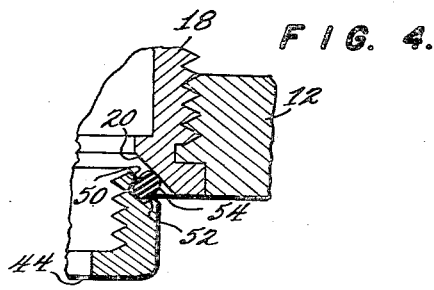
INVENTORS
H. M. McCAMISH
B. S. EVERETT
BY *Parker and Walsh*
ATTORNEYS

2,800,912

MOUNTING FOR PRESSURE RELIEF VALVE

Harley M. McCamish, Fresno, Calif., and Bernard S. Everett, Ipswich, England

Application August 17, 1956, Serial No. 604,735

6 Claims. (Cl. 137—68)

This invention relates to a relief valve mounting.

In connection with the storage of gases or liquids under pressure, it is necessary to provide relief valves to prevent the building up of excessive pressures. Heretofore, it has been common practice, when a relief valve was to be removed for inspection or replacement, it has been necessary to drain the pressure vessel in the interest of safety. Good safety practice requires that such pressure vessels be provided with a relief valve at all times. Obviously the practice of draining and refilling the pressure vessel is, at best, a time-consuming operation, to say nothing of the disruption of the operation of the system of which the pressure vessel forms a part.

The subject matter of this invention is a comparatively inexpensive device upon whch the relief valve is mounted, which constantly affords the protection necessary yet, by a simple operation, makes it possible to remove the relief valve for whatever period of time is necessary to make the repairs and replacement. The invention includes a member movable from one operative position to the other without loss of pressure in the vessel during the movement from one position to the other. In one operative position, the relief valve is connected into the system whereas it is isolated from the system in the other operative position. In the other operative position, there is interposed between the pressure vessel and the relief valve, a bursting disc of a strength corresponding to the loading of the relief valve. The relief valve may then be removed for servicing and, during the period that the relief valve is not in communication with the pressure vessel, the bursting disc affords adequate protection.

A fuller understanding of the invention may be had by reference to the accompanying drawing wherein—

Figure 1 shows a plan view of the device,

Figure 2 shows an elevation in section taken along the line 2—2 of Figure 1, and Figures 3 and 4 are enlarged views of portions of Figure 2.

The reference numeral 10 shows a flange fitting forming a part of the pressure vessel upon which the device of the invention is to be mounted. A circular plate 12 is provided with bolt holes 14 arranged in standard pattern for securing the plate to the flange of the pressure vessel fitting. The central aperture of the plate 12 is threaded for receiving bushing 16 from the under side. The threaded portion of the bushing forms an extension 18 rising above the upper surface of plate 12 a distance equal to one or two times the radius of the opening in the plate 12. A seat 20 is provided on the under side of bushing 16 for a purpose that will be explained below.

A tubular member 22, of a diameter to at least partially fit within the bushing 16 carries a top flange 24 for mounting a suitable pressure relief valve. Bolt holes 26 are arranged in a standard pattern for mounting. As shown, flange 24 is screwed to the member 22, whereupon it is fixed in position by weld 28.

Member 22 carries, about midway of its vertical length, a depending cap-like structure 30 made up of washer 32 and internally threaded ring 34. Washer 32 is secured to member 22 by weld 36 while ring 34 is secured to washer 32 by means of weld 38.

The threads of cap 30 cooperate with the threads of bushing 16 to enable the tubular member 22 to be screwed up or down with respect to flange 12.

In the lower part of tubular member 22 are a series of holes 40, having a total area at least equal to or greater than the area of the inner cross section of the member 22. They are so located that, when the cap 30 is screwed all the way down, the upper edge of the holes clears the lip 42 of seat 20.

Below the holes 40 on the tubular member a ring 44 is threaded upon corresponding threads on the lower extremity of member 22. The ring 44 has an inward turned lip 46 for holding a bursting disc 48 against the lower rim of member 22.

As shown in Figure 4, the upper portion of ring 44 has a face 50 having a slope corresponding to seat 20. A groove 52 is cut into face 50 to accommodate an O ring 54.

As shown in Figure 3, in the upper face of plate 12, just below the lower face 56 of ring 34, a groove 58 is cut to accommodate O ring 60.

*Operation*

All the parts of the device are assembled in the manner shown in Figure 2. Plate 30 is bolted to fitting 10 of the pressure vessel, suitable gaskets being employed to insure a tight seal. Similarly the pressure relief valve will be bolted by means of its flange to flange 24. The cap 30 will be screwed down upon bushing 16 until O ring 60 is sufficiently compressed to hold the desired pressure. The entire assembly is now in condition for normal operation. In the operative condition as outlined above, the pressure relief valve is in communication with the pressure vessel through the interior of member 22, and the holes 40.

When it is desired to remove the relief valve for inspection, cleaning or the like, the cap 30 is screwed upwardly on bushing 16 until O ring 54 is compressed in sealing engagement between seat 20 and face 50 of ring 44. Communication between the pressure vessel and the relief valve is thus cut off but bursting disc 48 has been interposed to afford protection in lieu of the pressure relief valve. The pressure relief valve may then be removed in the usual manner and, after cleaning or inspection, replaced while bursting disc 48 has served in its place. Thereafter cap 30 may be screwed down on plate 12 again and the relief valve has taken over the protection of the pressure vessel.

We claim:

1. A mounting for a pressure relief valve, adapted for mounting upon a standard flanged opening of a pressure vessel, comprising: an apertured plate having means for securing it in sealing engagement with the pressure vessel flange, a threaded tubular extension therefor, extending above the aperture thereof and annular sealing faces on the upper and under sides of said plate adjacent said aperture; an elongated tubular member threaded for receiving the threaded plate extension, means on the upper portion of said tubular member for mounting a pressure relief valve, means at the lower end of said member for mounting a bursting disc, a plurality of ports in the lower side wall of the tubular member, the combined area of said ports having at least as great an area as the free cross-sectional area of said member and a pair of annular sealing faces carried by said member for engagement with the sealing faces carried by the apertured plate, the one above the plate and the other between the bursting disc and the ports; and a pair of compressible sealing members one for each pair of sealing faces.

2. The combination of claim 1 wherein the sealing members are O rings and wherein one sealing face of each pair is provided with a groove for seating one of the O rings.

3. The combination of claim 1 wherein the sealing face on the underside of the apertured plate and its companion face carried by the tubular member are disposed at an angle to the surface expanse of the plate.

4. The combination of claim 1 wherein the mounting for the bursting disc permits replacement thereof to enable the use of a disc corresponding to the setting of the relief valve.

5. The combination of claim 1 wherein the aperture of the plate is internally threaded and the threaded extension is separately formed for threading into the aperture.

6. The combination of claim 1 wherein the threaded portion of the elongated tubular member is of larger diameter and concentric with said elongated member.

References Cited in the file of this patent

UNITED STATES PATENTS

| | | |
|---|---|---|
| 307,778 | Leggo | Nov. 11, 1884 |
| 1,766,740 | Bitchman | June 24, 1930 |
| 1,898,899 | Rowley | Feb. 21, 1933 |

FOREIGN PATENTS

| | | |
|---|---|---|
| 8,731 | Great Britain | Apr. 21, 1908 |